United States Patent
Lavoie et al.

(10) Patent No.: US 8,142,134 B2
(45) Date of Patent: Mar. 27, 2012

(54) TRANSPORTABLE BIN OR LIKE OBJECT

(75) Inventors: Claude Lavoie, Alberta (CA); Erin Herman, Clavet (CA); Alvin Herman, Saskatoon (CA)

(73) Assignee: Halliburton Energy Services Inc., Houston, TX (US)

( * ) Notice: Subject to any disclaimer, the term of this patent is extended or adjusted under 35 U.S.C. 154(b) by 0 days.

(21) Appl. No.: 12/694,848

(22) Filed: Jan. 27, 2010

(65) Prior Publication Data

US 2010/0196130 A1    Aug. 5, 2010

Related U.S. Application Data

(63) Continuation of application No. PCT/CA2008/001517, filed on Aug. 26, 2008.

(30) Foreign Application Priority Data

Sep. 4, 2007    (CA) ..................... 2600216

(51) Int. Cl.
   *B60P 1/00*    (2006.01)
(52) U.S. Cl. .................. 414/812; 414/339; 414/346
(58) Field of Classification Search .................. 414/812, 414/339, 346
   See application file for complete search history.

(56) References Cited

U.S. PATENT DOCUMENTS

| | | | |
|---|---|---|---|
| 3,421,644 A | 1/1969 | Butcher | |
| 3,547,291 A | 12/1970 | Batterton et al. | |
| 3,687,319 A | 8/1972 | Adam et al. | |
| 3,833,263 A | 9/1974 | Jackson | |
| 4,163,626 A * | 8/1979 | Batterton et al. | ............. 414/469 |
| 4,621,972 A | 11/1986 | Grotte | |
| 4,626,166 A | 12/1986 | Jolly | |
| 6,474,926 B2 | 11/2002 | Weiss | |
| 7,214,028 B2 | 5/2007 | Boasso et al. | |

OTHER PUBLICATIONS

PCT International Preliminary Report on Patentability for International Application No. PCT/CA2008/001517, dated Mar. 9, 2010, 1 page.
PCT Written Opinion of the International Searching Authority for International Application No. PCT/CA2008/001517, dated Dec. 17, 2008, 4 pages.
International Search Report for International Application No. PCT/CA2008/001517, dated Dec. 18, 2008, 3 pages.

* cited by examiner

*Primary Examiner* — Saul Rodriguez
*Assistant Examiner* — Willie Berry, Jr.
(74) *Attorney, Agent, or Firm* — J. Jay Haugen; Parlee McLaws LLP

(57) ABSTRACT

A transportable apparatus has a main body in a working position with a bottom end resting on the ground. The bottom end of a frame is pivotally attached to the main body above the bottom end of the main body and the frame is aligned with a side of the main body. An actuator pivots the frame downward about the pivot axis to a transport position where the frame extends substantially horizontally away from the main body. Wheels support the frame and a hitch at a top end of the frame is adapted for connection to a tow vehicle when the frame is in the transport position. When the frame is connected to a tow vehicle, the actuator can be operated to pivot the main body downward about the pivot axis to a lowered transport position where the main body rests on the frame for transport on the wheels.

11 Claims, 2 Drawing Sheets

TRANSPORTABLE BIN OR LIKE OBJECT

RELATED APPLICATIONS

The present application is a continuation of International Application No. PCT/CA2008/001517, entitled "Transportable Bin Or Like Object," filed Aug. 26, 2008, which claims priority to Canadian Patent Application Ser. No. 2,600,216, entitled "Transportable Bin Or Like Object," filed Sep. 4, 2007, each of which is hereby incorporated herein by reference in its entirety.

TECHNICAL FIELD

This invention is in the field of transporting large objects such as bins, tanks, and the like, and in particular transporting such objects in a horizontal orientation and then setting the object up in a vertical orientation at a work site.

BACKGROUND

In many industries it is required to set up an array of equipment at a temporary work site, and then disassemble the installation, move it to another work site, and re-assemble it. For example asphalt and concrete plants are often set up in locations where large quantities of material are required for road or building construction. Similarly well drilling rigs, such as those drilling for oil and gas, are set up at a drilling location, then taken down and moved to a different drilling location.

These portable plants and rigs typically include various tanks, bins, silos, and the like for water, asphalt, sand, cement, and other materials such as might be required at any particular work site. These are transported to the work site, often in a lowered horizontal transport orientation, and then raised to a vertical working orientation at the work site. For example bins containing dry material especially are often elongated vertically when in a working position to maximize the quantity of material stored above a hoppered bottom such that the dry material will flow out by gravity.

This vertical orientation also reduces the ground area, or footprint, occupied by the installation. For example in well drilling installations it is necessary to have a number of different materials located in proximity to the well being drilled, and the vertical orientation of tanks and bins facilitates such proximity. In other installations it may also be desirable to minimize the area occupied.

Bins and tanks are typically carried by flat bed trucks or trailers to the work site. The trailer is maneuvered into position, and then the bin is raised from the horizontal transport position to a vertical working position resting on the ground, and the trailer is moved away from the site. A loader machine or crane can be used, or in some cases the trailer itself may tilt up to the vertical, or near vertical position. Tipping and dumping vehicles are well known for a wide variety of purposes where the load carried is tilted upward from a substantially horizontal transport position.

U.S. Pat. No. 4,163,626 to Batterton et al. for example discloses an erection means for a transport trailer. A large object such as a bin is carried on a flatbed trailer in a horizontal orientation. The bin is pivotally attached to the rear end of the trailer, and actuators bear against the bin and trailer to pivot the bin up to the vertical position. The apparatus is configured such that when the bin is vertical the floor of the bin is on the ground. The bin can then be disconnected from the trailer and actuators and the trailer is driven away.

U.S. Pat. No. 3,833,263 to Jackson discloses a tipper vehicle that carries a load in a lowered position, illustrated as somewhat up from horizontal, and then raises the load to a vertical orientation resting on the ground. The described embodiment is for carrying a load comprising a stack of straw bales and depositing the bales on the ground. Once the load is tipped up to the vertical position, the trailer is driven away and the rear end of the vehicle slides out from under the stack of bales.

SUMMARY

It is an object of the present invention to provide a transportable main body such as a bin, silo, tank, or like large object that overcomes problems in the prior art.

In a first embodiment the present invention provides a transportable apparatus comprising a main body in a working position with a bottom end configured for resting on the ground, and sides extending upward from the bottom end. A frame is pivotally attached at a bottom end thereof to a lower portion of the main body about a substantially horizontal pivot axis located above the bottom end of the main body, the frame in an upright stored position substantially aligned with a first side of the main body. An actuator, disposed between and operatively coupled to the frame and to the main body, is operative to extend thereby pivoting the frame from the stored position downward about the pivot axis to a lowered transport position where the frame extends substantially horizontally away from the main body and wherein wheels rotatably attached to the apparatus support the apparatus for movement along the ground. A hitch at a top end of the frame is adapted for connection to a tow vehicle when the frame is in the transport position. When the frame is connected to a tow vehicle, the actuator can be retracted to pivot the main body downward about the pivot axis wherein the first side of the main body rests on the frame.

In a second embodiment the present invention provides a method of transporting a transportable apparatus comprising a main body. The method comprises providing the main body in a working position with a bottom end configured for resting on a ground surface, and sides extending upward from the bottom end; wherein the bottom end of a frame is pivotally attached to a lower portion of the main body about a substantially horizontal pivot axis located above the bottom end of the main body; positioning the frame in a stored position substantially aligned with a first side of the main body; maintaining the main body in the working position and operating an actuator, disposed between and operatively coupled to the main body and to the frame, to extend and pivot the frame from the stored position downward about the pivot axis to a lowered transport position where the frame extends substantially horizontally away from the main body; supporting the apparatus on wheels for movement along the ground; providing a hitch at a top end of the frame and connecting a tow vehicle to the hitch when the frame is in the transport position; operating the actuator to retract and pivot the main body downward about the pivot axis wherein the first side of the main body rests on the frame; and towing the frame and the main body to a desired location.

The main body is typically a large object such as a bin, tank, silo, or could be a machine or equipment. The apparatus thus provides a conveniently portable main body that can be transported to a desired location by an ordinary towing vehicle and then setup in a vertical orientation in a relatively compact horizontal space.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION

Figure 1:
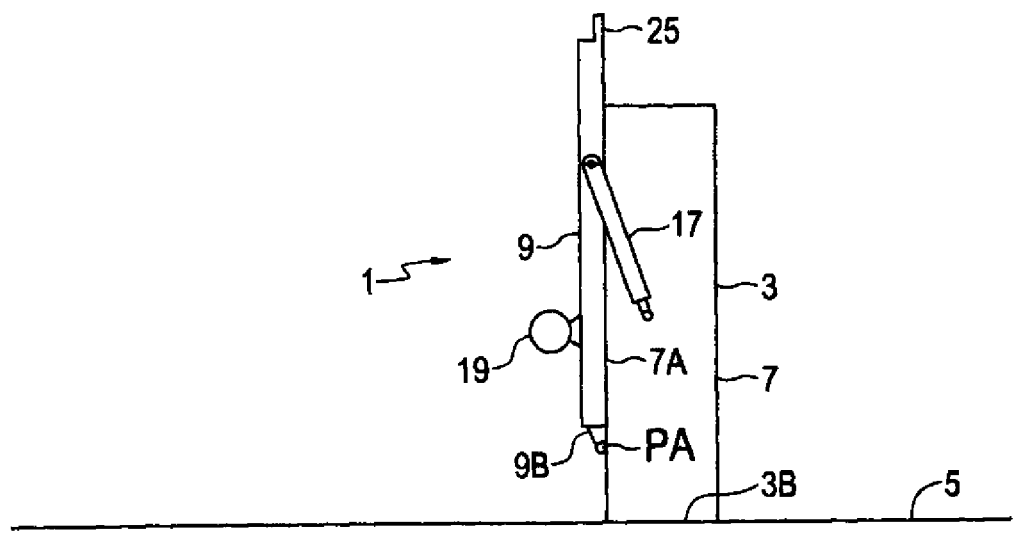
FIG. 1 is a schematic side view of an embodiment of the present invention in a working position.
Figure 2:
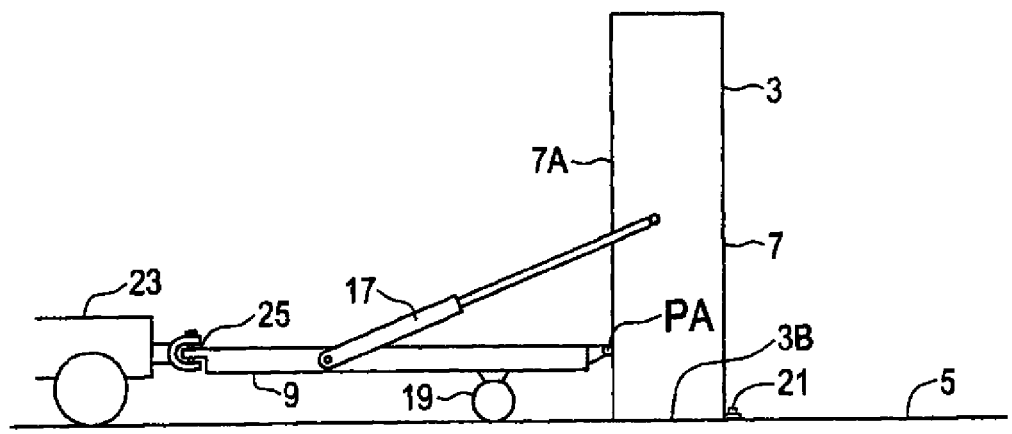
FIG. 2 is a schematic side view of the embodiment of FIG. 1 with the frame in a lowered transport position.
Figure 3:
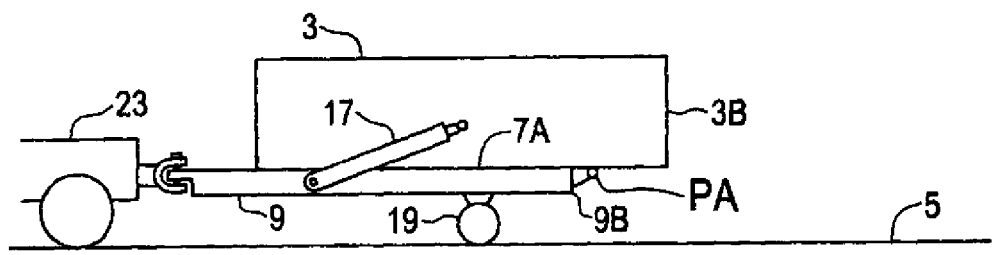
FIG. 3 is a schematic side view of the embodiment of Fig. with the frame and main body in a lowered transport position.

FIGS. 1-3 illustrate side views of a transportable apparatus 1. The apparatus 1 comprises a main body 3 oriented in its usual working position with a bottom end 3B resting on a ground surface 5, and sides 7 extending upward from the bottom end 3B. It is contemplated that the main body 3 could be a large container such as an elongated bin, tank, silo, or the like that is vertically oriented when working, and then for transport the container is emptied and laid down in a horizontal orientation to allow travel on roads. It is also contemplated that other large bodies, such as machinery, equipment, or the like that are carried horizontally and that are vertical when working could be transported as well.

A frame 9 is pivotally attached at a bottom end 9B thereof to a lower portion of the main body 3 about a substantially horizontal pivot axis PA located above the bottom end 3B of the main body 3. The frame 9 is shown in FIG. 1 in a stored position substantially aligned with a first side 7A of the main body 3.

The apparatus 1 as illustrated in FIG. 1, with the main body 3 in the working position and the frame 9 in the stored position, is located at a work site. A plurality of such apparatuses 1, where the main body 3 is bin 11 or a tank 13, is illustrated at a work site in the schematic top view of FIG. 4. It can be seen that the main bodies 3 can be positioned in close proximity to each other to facilitate whatever activity is taking place at a work location 15. It is contemplated that the work location 15 could be an oil well drilling operation, concrete plant, or the like. The apparatus 1 of the present invention is well suited to activities of a temporary nature, where the main body 3 will be used for a period of time, and then must be transported to a different work location where another activity will be conducted.

When the activity is completed, it will be necessary to transport the apparatus 1 to another desired location. This is readily accomplished by operating an actuator 17, which can be disposed between and operatively coupled to frame 9 and to main body 3 in some embodiments, to pivot the frame 9 from the stored position of FIG. 1 downward about the pivot axis PA to a lowered transport position as illustrated in FIG. 2 where the frame 9 extends substantially horizontally away from the main body 3. In some embodiments, frame 9 can be supported on wheels 19 for movement along the ground 5, as shown in FIG. 2.

The apparatus 1 is configured such that the main body 3 is maintained in the upright working position when the actuator 17 is operated to move the frame 9 downward to the transport position. The main body typically will have a weight sufficient to resist the torque forces exerted by the weight of the frame 9 as it moves away from the main body 3. Alternatively, or in addition, the main body 3 may be anchored to the ground by anchor stakes 21 securing the side of the main body 3 opposite the frame 9 to the ground 5. Weights or other anchoring means could be used as well to ensure the main body 3 does not topple over as the frame 9 moves away and down toward the transport position.

Once the frame 9 is lowered to the transport position of FIG. 2 a tow vehicle 23 is attached to a hitch 25 at the top end of the frame 9. The actuator 17 is then operated to pivot the main body 3 downward about the pivot axis PA to a lowered transport position where the first side 7A of the main body 3 rests on the frame 9. As the actuator 17 is operated to draw down the main body 3, the hitch 25 exerts an upward force on the tow vehicle 23, and the weight of the tow vehicle prevents the frame 9 from moving upward, such that the main body 3 is instead drawn down to rest on the frame 9. The apparatus 1 is then in a transport position where the tow vehicle 23 can tow the apparatus to a desired location.

The illustrated actuator 17 is provided by an cylinder, or a pair of cylinders, which typically will be a hydraulic or compressed air cylinder, pivotally and attached at one end to the main body 3 and pivotally attached at an opposite end to the frame 9 at a fixed location thereon. In the illustrated apparatus 1, the cylinder 17 is extended to pivot the frame 9 downward to the lowered transport position of FIG. 2, and is then retracted to pivot the main body 3 downward to the lowered transport position resting on the frame. Fluid conduits connect the cylinder 17 to a source of pressurized fluid and controls for extending and retracting the cylinder 17. The pressurized fluid source will commonly be provided on the towing vehicle 25, and the fluid conduits connected when required. It is contemplated that other actuators and configurations could be used as are known in the art.

In the illustrated apparatus 1 the pivot axis PA and the rotational axes of the wheels 19 are oriented substantially parallel to each other such that the main body 3 pivots downward in alignment with the travel direction. It can be seen that the apparatus 1 is configured such that the pivot axis PA is located on the main body 3 at a distance from the bottom end 3B such that the wheels 19 rest on the ground 5 when the frame 9 is in the transport position of FIG. 2. This positioning is not exact, and those skilled in the art will recognize that the apparatus 1 can operate with reasonable variations in the relative positions of the wheels 19 and main body 3.

When the apparatus has been towed to the next work location the operator will maneuver the frame 9 such that the bottom end 3B of the main body 3 is adjacent to a desired main body location in the transport position of FIG. 3. The cylinder 17 is then extended to pivot the main body 3 up to the working position of FIG. 3. The tow vehicle 23 is then disconnected and, if required the main body 3 is anchored in the working position. The cylinder 17 is then retracted to draw the frame 9 up to the stored position of FIG. 1. Locks will typically be provided to secure the frame 9 in the stored position.

Figure 4:
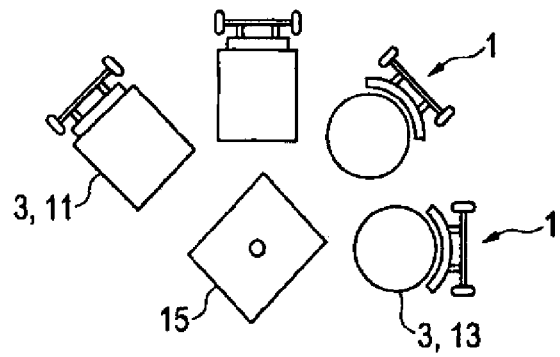
FIG. 4 is a schematic top view showing an array of apparatuses of FIG. 1 in proximity to a work location where access is available from numerous directions.
Figure 5:
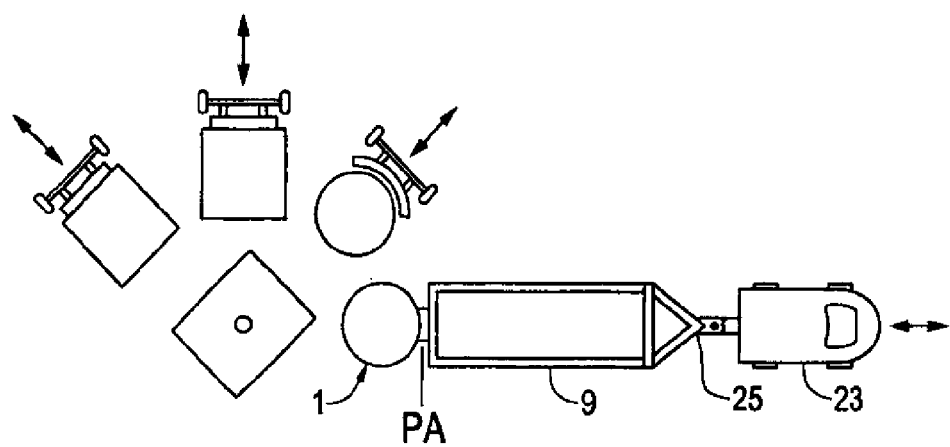
FIG. 5 is a schematic top view showing the array of FIG. 4 with the frame of one apparatus in the lowered transport position.
Figure 6:
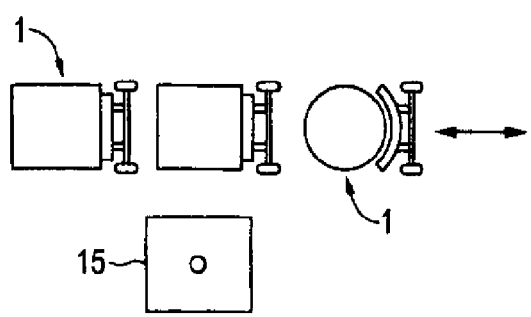
FIG. 6 is a schematic top view showing an alternate array of apparatuses of FIG. 1 in proximity to a work location where access is available from a single direction.

Thus a plurality of apparatuses 1 can be positioned around a work location 15 as illustrated in FIG. 4 where there is access to the location from all sides. FIG. 5 illustrates an apparatus 1 where the frame 9 is in the transport position and a tow vehicle 23 is connected to the hitch 25. A tow vehicle can move the apparatuses 1 into position and remove same along the arrows shown. FIG. 6 illustrates an alternate arrangement where access to the work location 15 is only available in a single direction indicated by the arrows, requiring that the apparatuses 1 be installed and removed in order.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A transportable apparatus comprising:
   a main body in a working position with a bottom end configured for resting on the ground, and sides extending upward from the bottom end, wherein the main body is one of a tank, a bin, and a silo;
   a frame pivotally attached at a bottom end thereof to a lower portion of the main body about a substantially horizontal pivot axis located above the bottom end of the main body, the frame oriented in an upright stored position substantially aligned with a first side of the main body;
   at least one cylinder disposed between and operatively coupling the main body to the frame, the at least one cylinder comprising a first end pivotally attached to the main body and a second end pivotally attached to the frame at a fixed location thereon, the at least one cylinder operative to extend thereby pivoting the frame from the stored position downward about the pivot axis to a lowered transport position where the frame extends substantially horizontally away from the main body and wherein wheels rotatably attached to the apparatus support the apparatus for movement along the ground;
   a hitch at a top end of the frame adapted for connection to a tow vehicle when the frame is in the transport position;
   wherein, when the frame is connected to a tow vehicle, the at least one cylinder operative to retract thereby pivoting the main body downward about the pivot axis wherein the first side of the main body rests on the frame.

2. The apparatus of claim 1 wherein the main body has a weight sufficient to maintain the main body in the working position when the at least one cylinder is operated to move the frame downward to the lowered transport position.

3. The apparatus of claim 1 wherein the main body is configured to be anchored in the working position to maintain the main body in the working position when the at least one cylinder is operated to move the frame downward to the lowered transport position.

4. The apparatus of claim 1 wherein the pivot axis is oriented substantially parallel to a rotational axis of the wheels.

5. The apparatus of claim 1 wherein the wheels are rotatably attached to the frame.

6. A method of transporting a transportable apparatus comprising a main body, the method comprising:
   providing the main body in a working position with a bottom end configured for resting on a ground surface, and sides extending upward from the bottom end, wherein the main body is one of a tank, a bin, and a silo, and wherein the bottom end of a frame is pivotally attached to a lower portion of the main body about a substantially horizontal pivot axis located above the bottom end of the main body;
   positioning the frame in a stored position substantially aligned with a first side of the main body;
   maintaining the main body in the working position and operating at least one cylinder, disposed between and operatively coupled to the main body and to the frame, to extend and pivot the frame from the stored position downward about the pivot axis to a lowered transport position where the frame extends substantially horizontally away from the main body, the at least one cylinder comprising a first end pivotally attached to the main body and a second end pivotally attached to the frame at a fixed location thereon;
   supporting the apparatus on wheels for movement along the ground;
   providing a hitch at a top end of the frame and connecting a tow vehicle to the hitch when the frame is in the transport position;
   operating the at least one cylinder to retract and pivot the main body downward about the pivot axis wherein the first side of the main body rests on the frame; and
   towing the frame and the main body to a desired location.

7. The method of claim 6 further comprising:
   maneuvering the frame such that the bottom end of the main body is adjacent to a desired main body location;
   operating the at least one cylinder to pivot the main body from the lowered transport position upward about the pivot axis to the working position;
   disconnecting the tow vehicle from the hitch; and
   operating the at least one cylinder to move the frame upward to the stored position while maintaining the main body in the working position.

8. The method of claim 6 wherein the main body has a weight sufficient to maintain the main body in the working position when the at least one cylinder is operated to move the frame downward to the transport position.

9. The method of claim 6 further comprising anchoring the main body in the raised working position to maintain the main body in the working position when the at least one cylinder is operated to move the frame downward to the transport position.

10. The method of claim 6 wherein the pivot axis is oriented substantially parallel to a rotational axis of the wheels.

11. The method of claim 6 wherein the wheels are rotatably attached to the frame.

* * * * *